Patented Nov. 1, 1949

2,486,659

UNITED STATES PATENT OFFICE 2,486,659

CATALYTIC PROCESS FOR THE PREPARATION OF ACRYLIC ACID NITRILE

Peter Kurtz, Leverkusen-Wiesdorf, Germany; vested in the Attorney General of the United States No Drawing. Application June 29, 1940, Serial No. 343,269. In Germany July 10, 1939

16 Claims. (Cl. 260—465.3)

REISSUED
SEP 5 1950
RE 23265

This invention relates to a process of preparing acrylic acid nitrile and comprises bringing acetylene together with hydrocyanic acid into contact with a suitable catalyst.

It is known that by passing acetylene into an aqueous acid reacting solution of cuprous chloride and alkali chlorides or ammonium chloride, vinyl derivatives are obtained.

Now my present invention is based on the perception that catalysts for bringing about those addition reactions of acetylene which result in vinyl derivatives thereof also effect the addition of hydrocyanic acid on acetylene. Briefly stated my process consists in bringing acetylene together with hydrocyanic acid into contact with an acid reacting solution of cuprous chloride as a catalyst. It may be pointed out that all variations in the catalyst as they are known in the formation of vinyl derivatives from acetylene may be advantageous in my present process. Thus, for instance, an aqueous acid reacting catalyst is preferably employed, prepared from cuprous chloride and a salt of the class consisting of ammonium, amine and alkali salts. It is advantageous to add to the catalyst copper powder in order to maintain the copper salt in the monovalent state as cupric copper may cause undesired side reactions. The acid reaction of the catalyst is attained by adding a strong acid such as hydrochloric acid, hydrobromic acid, sulfuric acid or phosphoric acid and it is preferable to adjust the pH to about 6, however, a catalyst having a stronger acid reaction may also be employed. A suited catalyst may be composed from 45.5 parts of cuprous chloride, 24.5 parts of ammonium chloride, 42 parts of water and 2.8 parts of concentrated hydrochloric acid. Equivalents may be used for the chemicals named and the proportions of the constituents may be varied.

The reaction may be carried out at temperatures between 0–200° C. but it is preferable to hold the temperature at about 80° C. when working under atmospheric pressure. The acetylene and the hydrocyanic acid may be passed in at atmospheric and higher pressures. It is advantageous to work with an excess of acetylene, for instance, one part of hydrocyanic acid and 10 parts of acetylene. Obviously, the reaction may be carried out in a continuous process.

The following examples illustrate my invention without, however, restricting it thereto the parts being by weight.

Example 1

20 parts of anhydrous hydrocyanic acid are dropped at 80° C. into a mixture consisting of 300 parts of cuprous chloride, 100 parts of ammonium chloride, 5 parts of concentrated hydrochloric acid, 10 parts of copper powder and 400 parts of water which has been heated to 86° C. in a nitrogen atmosphere while stirring and passing in acetylene in excess. The reaction vessel is connected with a condenser. Water and an oily substance distil the latter forming the upper layer. When all hydrocyanic acid is dropped in the reaction mixture is heated to 103° C. with further passing in acetylene. Further amounts of water and oil distil. The oily distillate (27 parts) is separated from the aqueous solution, which contains unchanged hydrocyanic acid, dried and distilled. At first some vinyl acetylene distils, finally the acrylic acid nitrile. A residue consists of divinyl acetylene. The catalyst may be used for several crops. The distilled water may be reconveyed in the catalyst.

Example 2

40 parts of a mixture consisting of equivalent amounts of acetylene and hydrocyanic acid are added at room temperature to the catalyst which has been mentioned in Example 1. The temperature rises slowly, but is not permitted to rise about 30° C. The acetylene is completely absorbed. The reaction mixture is allowed to stand for several hours and then slowly heated. At temperatures between 70° C. and 103° C. a mixture consisting of acetylene, hydrocyanic acid, acrylic acid nitrile and water distils. The acrylic acid nitrile separates as an oil which forms the upper layer. It may be worked up as stated in Example 1.

Example 3

1170 parts of cuprous chloride and 630 parts of ammonium chloride are heated to 80° C. with exclusion of air together in 1010 parts of water with the addition of 43 parts of concentrated hydrochloric acid and 36 parts of copper powder. All components dissolve with the exception of copper. 120 parts of acetylene and 13.5 parts of hydrocyanic acid per hour are passed in at a temperature of 80° C. The escaping vapors are at first precooled in a condenser in order to separate the water. Then the vapors are dried for completely removing the water and subjected to a low cooling at —70° C. The noncondensed portion consists practically of acetylene and is reconveyed in the cycle with addition of 15 parts of acetylene what corresponds to the converted portion. Likewise 13.5 parts of hydrocyanic acid must be introduced in the cycle per hour, however, this amount may be partly recovered from the condensate.

The condensate which is collected during several hours is distilled. It yields at first some acetylene, then vinyl acetylene and hydrocyanic acid, finally as main product acrylic acid nitrile. The yield is (calculated on the consumed amount of hydrocyanic acid) about 90% and (calculated on the consumed amount of acetylene) about 70%.

With similar success the hydrochloric acid may be replaced by other acids, for instance, sulfuric acid, phosphoric acid or hydrobromic acid. Furthermore the ammonium chloride may be replaced by salts of ammonia with other acids (for instance ammonium sulfate) as well as by salts of amines.

*Example 4*

450 g. of cuprous chloride are heated together with 200 g. of sodium chloride in 525 g. of water with the addition of 15 g. of copper powder at 80° C. Partial solution occurs. At 80° C. and atmospheric pressure 100 liters of acetylene and 5.3 g. of hydrocyanic acid per hour are passed in. The consumption of acetylene amounts to 42 liters per hour. It is substituted as stated in the preceding example. Likewise 5.3 g. of hydrocyanic acid per hour must be conveyed in the cycle. When worked up as stated in the preceding example 5 g. of acrylic acid nitrile per hour are obtained.

*Example 5*

545 g. of cuprous chloride and 435 g. of ammonium chloride are heated to 80° C. in 500 g. of water with the addition of 20 g. of copper powder. Clear solution occurs with exception of the copper. When 100 liters per hour of acetylene are passed in 4 liters per hour are consumed. Besides 3.8 g. of hydrocyanic acid per hour were added. When worked up as stated in Example 3, 4.8 g. of acrylic acid nitrile per hour are obtained.

*Example 6*

Acetylene with a speed of 7000 liters per hour is passed through a catalyst prepared from 45.5 kg. cuprous chloride, 24.5 kg. of ammonium chloride, 42 liters of water and 2.4 liters of concentrated hydrochloric acid at a temperature of 80° C. To the acetylene are added 530 g. of hydrocyanic acid per hour. The escaping vapors are separated by cooling as stated in Example 3. The acetylene is conveyed in a cycle and the consumed part and the hydrocyanic acid are substituted. 600 liters of acetylene per hour are consumed, which must be substituted, 908 g. of pure acrylic acid nitrile per hour are obtained.

I claim:

1. Process for the manufacture of acrylic acid nitrile which comprises bringing acetylene together with hydrocyanic acid into contact with an aqueous acid reacting solution of cuprous chloride said solution containing also a salt of the class consisting of ammonium, amine and alkali salts.

2. Process for the manufacture of acrylic acid nitrile which comprises bringing acetylene together with hydrocyanic acid into contact with an aqueous acid reacting solution of cuprous chloride said solution containing also copper powder and an ammonium salt.

3. Process for the manufacture of acrylic acid nitrile which comprises bringing acetylene together with hydrocyanic acid into an aqueous solution prepared from cuprous chloride and a salt of the class consisting of ammonium, amine and alkali salts.

4. Process for the manufacture of acrylic acid nitrile which comprises bringing acetylene together with hydrocyanic acid into an aqueous acid reacting solution prepared from cuprous chloride and a salt of the class consisting of ammonium, amine and alkali salts said solution containing also copper powder.

5. Process for the manufacture of acrylic acid nitrile which comprises passing acetylene together with hydrocyanic acid into an aqueous acid reacting solution prepared from cuprous chloride and ammonium chloride.

6. Process for the manufacture of acrylic acid nitrile which comprises passing acetylene together with hydrocyanic acid into an aqueous acid reacting solution prepared from cuprous chloride and ammonium chloride said solution containing also copper powder.

7. Process for the manufacture of acrylic acid nitrile which comprises passing acetylene together with hydrocyanic acid into an aqueous acid reacting solution prepared from 45.5 parts of cuprous chloride, 24.5 parts of ammonium chloride, 42 parts of water and 2.85 parts of concentrated hydrochloric acid at a temperature of about 80° C.

8. Process for the manufacture of acrylonitrile which comprises bringing acetylene together with hydrocyanic acid into contact with an aqueous acid reacting solution of cuprous chloride, said solution containing also a salt of the class consisting of ammonium and alkali metal salts.

9. The process of preparing acrylonitrile which comprises reacting acetylene and hydrocyanic acid in an acidic aqueous solution comprising cuprous chloride and ammonium chloride as a solubilizer for the cuprous chloride.

10. The process as defined in claim 9 wherein the acid aqueous solution contains an amount of copper sufficient to maintain the copper chloride in the cuprous state.

11. The process of preparing acrylonitrile which comprises reacting acetylene and hydrocyanic acid in an aqueous solution of a cuprous halide as a catalyst at a temperature within the range of 70° to 103°.

12. The process of preparing acrylonitrile which comprises reacting acetylene and hydrocyanic acid in an aqueous solution of cuprous chloride as a catalyst at a temperature within the range of 70° to 103°.

13. The process of preparing acrylonitrile which comprises reacting acetylene and hydrocyanic acid in the presence of a catalytic solution of a cuprous halide.

14. The process of preparing acrylonitrile which comprises reacting acetylene and hydrocyanic acid in the presence of an aqueous catalytic solution of a cuprous halide.

15. The process of preparing acrylonitrile which comprises reacting acetylene and hydrocyanic acid in the presence of an acidic catalytic solution of a cuprous halide.

16. The process of preparing acrylonitrile which comprises reacting acetylene and hydrocyanic acid in the presence of an acidic catalytic solution of cuprous chloride.

PETER KURTZ.

REFERENCES CITED

The following references are of record in the file of this patent:

FOREIGN PATENTS

| Number | Country | Date |
|---|---|---|
| 559,734 | Germany | Sept. 23, 1932 |